US011786818B2

(12) United States Patent
Gillberg et al.

(10) Patent No.: US 11,786,818 B2
(45) Date of Patent: Oct. 17, 2023

(54) AUTOPLAYERS FOR FILLING AND TESTING ONLINE GAMES (71) Applicant: Electronic Arts Inc., Redwood City, CA (US)

(72) Inventors: Bengt Jonas Gillberg, Stockholm (SE); Stefan Posthuma, Stockholm (SE)

(73) Assignee: Electronic Arts Inc., Redwood City, CA (US)

(*) Notice: Subject to any disclaimer, the term of this patent is extended or adjusted under 35 U.S.C. 154(b) by 63 days.

(21) Appl. No.: 17/645,487

(22) Filed: Dec. 22, 2021

(65) Prior Publication Data
US 2022/0184498 A1 Jun. 16, 2022

Related U.S. Application Data (63) Continuation of application No. 16/867,173, filed on May 5, 2020, now Pat. No. 11,241,622.

(51) Int. Cl.
A63F 13/58 (2014.01)
A63F 13/35 (2014.01)

(52) U.S. Cl.
CPC ............ A63F 13/58 (2014.09); A63F 13/35 (2014.09)

(58) Field of Classification Search
None
See application file for complete search history.

(56) References Cited

U.S. PATENT DOCUMENTS

| 2013/0005479 | A1  |  1/2013 | McCaffery et al. |
| 2017/0136362 | A1* |  5/2017 | Bucher ............... A63F 13/798 |
| 2019/0275431 | A1  |  9/2019 | Labate et al. |
| 2019/0308105 | A1* | 10/2019 | Lai ........................ A63F 13/335 |
| 2020/0306643 | A1  | 10/2020 | Borovikov et al. |
| 2020/0384362 | A1* | 12/2020 | Shah ..................... A63F 13/424 |
| 2021/0001229 | A1* |  1/2021 | Somers .................. A63F 13/56 |
| 2021/0346803 | A1  | 11/2021 | Gillberg et al. |
| 2022/0054945 | A1* |  2/2022 | Salik ...................... A63F 13/87 |

OTHER PUBLICATIONS

U.S. Office Action for U.S. Appl. No. 16/867,173, dated May 25, 2021, Gillberg, "Autoplayers for Filling and Testing Online Games", 7 Pages.

* cited by examiner

Primary Examiner — Ronald Laneau
(74) Attorney, Agent, or Firm — Lee & Hayes, P.C.

(57) ABSTRACT

An autoplayer system and method enables one or more automated player(s) (autoplayers) that can be used to populate and/or fill a multiplayer online game. The autoplayers may emulate a human player in playing the online game. By filling the online game, the autoplayers may enhance the enjoyment of the human players in playing the online game. Additionally, autoplayer(s) may be used to replace players who drop out of the online game during gameplay of the online game, so that the remaining players can experience a sufficiently filled online game that continues in a similar manner as when the online game was initiated. Autoplayer(s) can also be used to test an online game, such as with a relatively large number of players, prior to deployment for players to play. New features that have been added to an online game can also be tested using autoplayers.

20 Claims, 8 Drawing Sheets

AUTOPLAYERS FOR FILLING AND TESTING ONLINE GAMES

CROSS REFERENCE TO RELATED APPLICATIONS

This application is a continuation of co-pending U.S. patent application Ser. No. 16/867,173 filed May 5, 2020, entitled "Autoplayers for Filling and Testing Online Games," which is incorporated by reference here in in its entirety.

BACKGROUND

Online gaming allows for players to play a variety of electronic and/or video games with each other via network connectivity, such as via the Internet. Users who wish to play an online game may be matched with each other to play the game, even though those players may be remotely located from each other. This online gaming may be enabled by online gaming system(s) to which each of the players may connect using client devices.

Online gaming, via network technology, may allow for a relatively large number of players, such as 64 players or 256 players, playing the online game together. This may enhance the enjoyment of players who participate in these games with a relatively large number of other players. However, at times, there may not be enough players to fill these multi-player online games. Not having enough players who can be matched together in an online game may reduce the enjoyability of that online game. Additionally, an online game may be initiated with a certain number of players, but during the course of that online game play, one or more players may drop out of the online game. Again, players dropping out of the online game may reduce the enjoyability of the online game for the players who remain in the online game.

As multiplayer online games have become more complex over time, testing these online games during and after the development stage has become increasingly challenging. In some cases, a developer may wish to test a new functionality or feature designed into an online game. In other cases, it may be desirable to test an online game with a large number of players playing the game to stress test the game and/or determine the robustness of the online game.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Example embodiments of this disclosure describes methods, apparatuses, computer-readable media, and system(s) for providing autoplayers for online games. In some cases, the autoplayers may be used to fill online games when there may be less than a threshold number of human players. In some multiplayer online games, having an insufficient number of players may diminish the enjoyment derived from those online games. Being able to fill multiplayer online games, such as first-person shooter games, with autoplayers may enhance the enjoyment derived by human players of the online game. In other cases, autoplayers may be used to test features and/or the robustness of online games during or after development of the online game. For example, an autoplayer may be spawned in an online game to use, and thereby test, a new feature that a game developer or software developer may have recently developed and/or implemented. In this way, the game developer, by using autoplayers, can get quick and/or automated feedback on features that he or she has developed. Additionally, with the use of autoplayers, online games may be tested with a relatively high number of players, which may otherwise be cost prohibitive and/or technically prohibitive using human testers.

The autoplayers, as described herein, may be software agents and/or bots that may engage with one or more application programming interfaces (APIs) of online gaming system(s) hosting the online game. In some cases, the autoplayer(s) may operate on the online gaming system(s) hosting the online game and, in other cases, the autoplayer(s) may operate on a client-side device, such as on a developer system and/or on a quality assurance (Q/A) test system. In yet other cases, some autoplayer(s) may be controlled on a developer system and/or Q/A test system, while other autoplayer(s) may be controlled on the online gaming system(s). The autoplayers, regardless of which system they operate on and/or are controlled by, interact with the online gaming system(s) in the same or similar manner as a human player may interact with the online gaming system(s) via his or her client device. In example embodiments, the online gaming system(s) may not know whether a particular player, with which it is interacting, is a human player or an autoplayer. The autoplayer, in this way, controls its respective avatar and/or character in the online game.

According to example embodiments of the disclosure, an autoplayer may interact with the online gaming system(s) by receiving game state data from the online gaming system(s) and, in response, sending controller inputs, such as controller inputs that a human would generate by interacting with a game controller, to the online gaming system(s). In this way, the autoplayer may repeatedly and/or continuously control a character and/or avatar in the online game. In example embodiments, the autoplayer may play in a similar manner as a human player, in that game state information is processed and reacted to by the autoplayer as operated on either the online gaming system(s) or other client-side system(s).

As described herein, the autoplayers according to example embodiments, may operate according to information that may only be available to human players. For example, objects in the virtual play space that may be obfuscated to a human player may also be treated as being obfuscated for the autoplayer. In this way, the autoplayer may operate in a manner that substantially mimics a human player. Additionally, the autoplayer may generate controller inputs (e.g., inputs that may be made to and/or via a game controller, joystick, mouse, etc.). Thus, in example embodiments, the autoplayer may interact with the same APIs that a client device of a human player may interact, rather than with the online gaming code at a deeper and/or lower level. Again, these implementations and features may enhance the human-like characteristics of the autoplayers. In other words, the human-like characteristics of autoplayers may be emulated through system architecture, like the autoplayer having limited access to game state and being external to the game process, interacting with the game process through virtualized controller input, and acting on limited state information like visibility of enemies, terrain collision information, and such.

In example embodiments, an autoplayer may be spawned with one or more parameters defined to control aspects of the autoplayer's gameplay. For example, one or more parameters may define any variety of gameplay style (e.g., defensive, aggressive, mixed (defensive and aggressive), etc.), skill level (e.g., on a numerical scale, such as 1 to 10, or as beginner, intermediate, skilled, etc.), shooting accuracy level, level of movement, or any other suitable parameters that may control the style of play of the autoplayer. In some cases, the parameters may be defined when the autoplayer is launched for the purposes of filling an online game or for testing an online game. In further example embodiments, an autoplayer may be launched with a purpose to test a particular feature of a game. For example, an autoplayer may be initiated to explore the game field (e.g., as much of the area of the online game mapped area) of the online game. In other cases, the autoplayer may be used to test a particular weapon as much as possible. Indeed, an autoplayer may be used to test any suitable feature of the online game. While a particular feature is being tested by use of an autoplayer, such as by way of extended use of that feature, data may be collected that may be provided at the end of gameplay.

In example embodiments, the autoplayers may be controlled according to a deterministic set of actions responsive to game state data of the online games. Thus, the actions of an autoplayer, in these cases, may be repeatable responsive to particular game states, as controlled via its underlying computer code and/or script. In example embodiments, the autoplayer may function not just according to its own computer code, but also in conjunction with a game engine of the online game. In other cases, there may be variability programmed into the actions of the autoplayers used for online gaming. The parameters for controlling the autoplayers may be provided by any suitable entity (e.g., the online gaming system(s), a developer, a tester, etc.) to guide the nature of the actions of the autoplayers. In some example embodiments, an autoplayer may be guided by any variety of machine learning, where past interactions with the online game may guide and/or refine future interactions with the online game. In these embodiments, any variety of machine learning, artificial intelligence, and/or heuristic models may be used to guide the actions of the autoplayer. In some cases, autoplayers may be trained prior to deployment and use, and in other cases, the autoplayers may learn-by-doing, or refine gameplay based at least in part on previous gameplay of the online game.

With multiplayer online games, a number of players may indicate their desire to play in an online game and may temporarily be placed in a virtual waiting room while additional players are given an opportunity to join the online game. Generally, waiting for an online game to start may diminish the overall enjoyment experienced by a player. Thus, there may be a tradeoff between being able to fill the online game and making people wait relatively longer periods of time for the start of the online game. On one hand, accumulating additional players by waiting to start a new online game may result in greater enjoyment of playing in a full or near-full online game. However, on the other hand, waiting an extended period of time to fill the online game may detract from the players' gameplay experience. Additionally, if players are to be grouped according to other parameters, such as skill level, Internet connectivity speeds, location, etc., then it may take even longer to accumulate enough players to begin the online game. According to example embodiments of the disclosure, even if a sufficient number of players are not accumulated in a reasonable amount of time (e.g., 30 seconds, 1 minute, 5 minutes, etc.) prior to launching the online game, the online game may still operate with a sufficient number of players by using autoplayers during gameplay. Thus, autoplayers can be used to fill an online game with a threshold number of overall players without having to make players wait long periods of time to start an online game or without needing to add players to online games that had already started. In some cases, autoplayers may be used to fill an online game to its maximum allowed capacity.

In example embodiments, when autoplayers are used to populate and/or fill an online game, the parameters defined to operate those autoplayers may be so that the skill level is similar to the aggregate skill level (e.g., mean skill level, median skill level, etc.) of the human players in the online game. In some cases, when there are multiple autoplayers in the online game, there may also be a spread in the skills and abilities (e.g., shooting aim, speed, skill, etc.) of the autoplayers to reflect the spread of such skills and/or abilities of the human players in the online game. In this application of filling an online game, the autoplayers may be controlled by the online gaming system(s) that host the online game.

In some example embodiments, an online game may be started with a certain number of players and partway through the online game, prior to the online game ending, one or more players may drop out. The player dropping out of the game may be intentional (e.g., the player has other things to do) or the player dropping out of the game may be unintentional (e.g., the player's network connection dropped). In example embodiments, when a player drops out of the online game, an autoplayer may be inserted in the dropped-out player's place, so that the remaining players can continue playing the online game with substantially the same types of conditions (e.g., initial number of players) with which they started the online game. In some example embodiments, the replacement autoplayer may be controlled such that the autoplayer plays with similar characteristics (e.g., skill, aggressiveness, aim, style, weapons used, etc.) as the human player that the autoplayer replaces.

The autoplayers, in example embodiments, may be used by a game developer to test a feature that he or she developed. For example, if a game developer developed a new weapon to be used in a first-person shooter game, he or she may want to get quick feedback on the new feature. The developer may wish to launch a game with one or more autoplayer and at least some of the autoplayers may be operated in a manner such that the new feature is used more often to test that feature (e.g., the new weapon). Thus, by using the new feature in a variety of scenarios, data may be collected by the autoplayers that may be used by the developer to gain confidence in the new feature, or alternatively to identify issues that may need to be addressed with the new feature. The autoplayers that are used for feature testing may be controlled on the server-side (e.g., the online gaming system(s)), a developer system, and/or the combination of the online gaming system(s) and the developer system. For example, when multiple autoplayers are used for feature testing, some of the autoplayers may be run on the developer system and the other of the autoplayers may be run on the online gaming system(s). The data collected by a particular autoplayer during gameplay may indicate, for example, how long the autoplayer used the feature to be tested, if there were any unexpected actions from using the feature to be tested, the effectiveness of the feature, whether the feature to be tested affected any other features of the online game, etc.

In some case, quality assurance (Q/A) functions may be performed by one or more autoplayers playing an online game. Testing multiplayer online games, and especially multiplayer online games with a relatively large number of players, can be challenging and cost prohibitive. For example, testing a 64 player online game at its maximum capacity may require 64 different human testers to play the online game to identify any defects in the online game. However, by using autoplayers, as disclosed herein, Q/A tests can be run with a large number of autoplayers to test various aspects of the online game, such as its robustness in being able to operate long-term while hosting a large number of players. In example embodiments, the online game may be launched with a plurality of autoplayers and the autoplayers may play the online game uninterrupted for time periods that would not be practical for a human to play the online game (e.g., 8 hours) and generate data on various features and general attributes of the online game and/or the online gaming system(s). For example, an online game may be played by a plurality of autoplayers and data, such as mean time between failure (MTBF), may be generated. The autoplayers, as described herein for Q/A testing, may be controlled by the online gaming system(s), a Q/A test system, a developer system, or combinations thereof.

Although discussion of the autoplayers may be in the context of shooting games, it should be understood that the autoplayers, as described herein, may be deployed in any variety of online games and genres thereof. Additionally, although examples in the realm of video games and online gaming are discussed herein, it should be understood that the autoplayer mechanism for online game filling and/or online game testing, as described herein, may be applied to any variety of other online and/or digital interactions. Further still, although the autoplayer mechanism is discussed in the context of online gaming, it should be understood that the autoplayer mechanism, as described herein, may be deployed in offline games. For example, an autoplayer may be used in single player mode where the client and online gaming system operate on the same platform (e.g., a home gaming platform), such as in an inproc server mechanism.

It should be understood that the systems and methods, as discussed herein, are technological improvements in the field of online interactions and online gaming. For example, the methods and systems as disclosed herein enables computing resources to improve online gaming for players by filling multiplayer online games when a sufficient number of human players are not available to play the online game. Additionally, the autoplayers, as described herein emulate human behaviors in playing online games, making them appear more realistic to human players. These improvements manifest in greater enjoyment in online gameplay by players. Indeed, the disclosure herein provides improvements in the functioning of computers to provide improvements in the technical field of online gaming and the operations of multiplayer online games. Filling online games in this manner would not be possible using traditional processes of online gaming. Thus, not only is the disclosure directed to improvements in computing technology, but also to a variety of other technical fields related to online gaming.

It should further be understood that the systems and methods, as discussed herein, provide technological improvements in the field of testing and quality assurance (Q/A) of online gaming. For example, the methods and systems as disclosed herein enables the testing of features of online games and/or testing using a plurality, and sometimes a relatively large number, of players in the form of autoplayers. Testing multiplayer games with a large number of test players may not be possible without the autoplayer technology as described herein. These improvements manifest in quicker and/or better testing of online games and/or features therein. Indeed, the disclosure herein provides improvements in the functioning of computers to provide improvements in the technical field of testing and quality assurance of online gaming, particularly for multiplayer online games. Thus, not only is the disclosure directed to improvements in computing technology, but also to a variety of other technical fields related to testing online gaming.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

Figure 1:
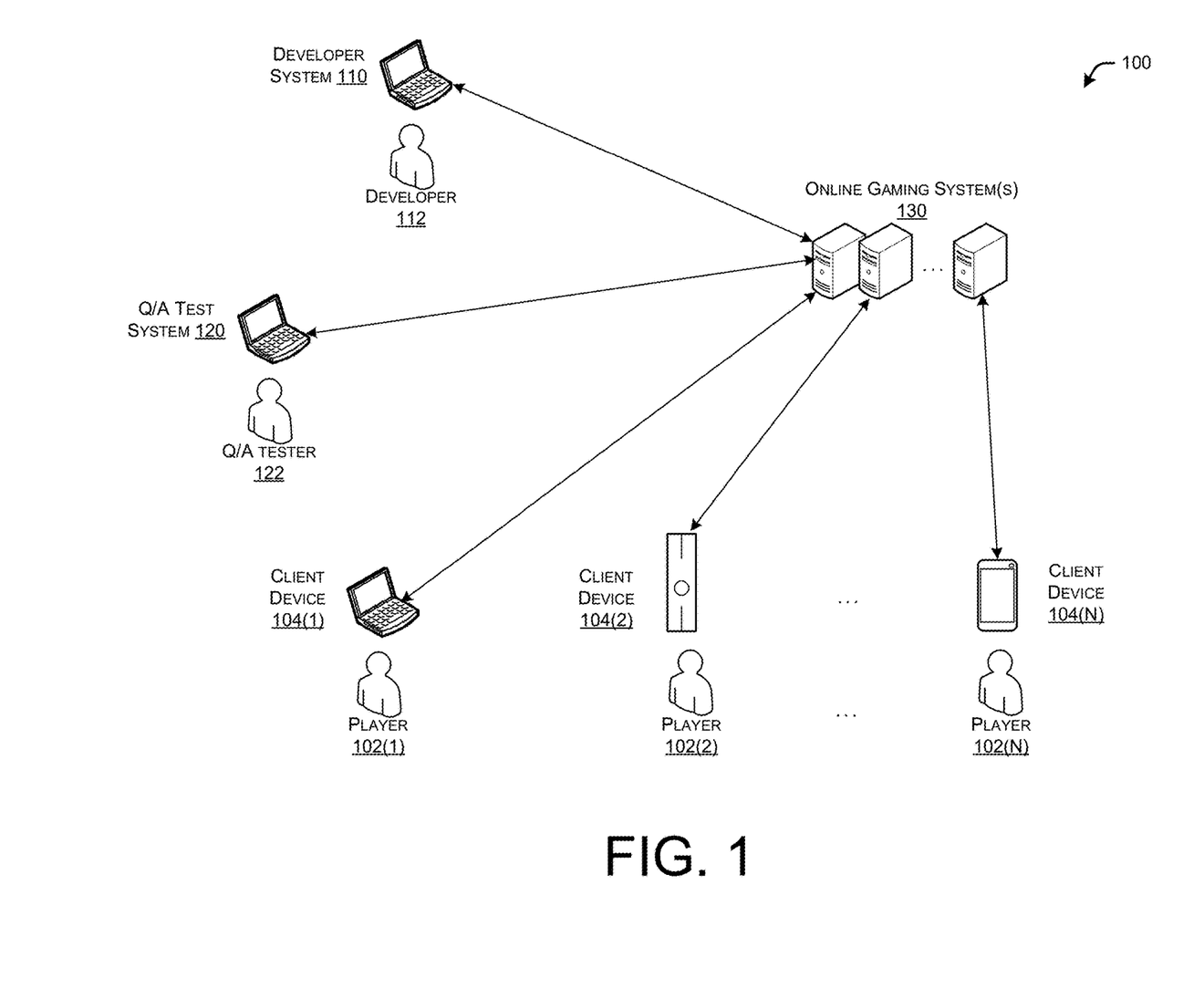
FIG. 1 illustrates a schematic diagram of an example environment with online gaming system(s) to enable online gaming with autoplayers for online game filling or for testing online games, in accordance with example embodiments of the disclosure.

FIG. 1 illustrates a schematic diagram of an example environment 100 with online gaming system(s) 130 to enable online gaming with autoplayers for online game filling or for testing online games, in accordance with example embodiments of the disclosure. The example environment 100 may include one or more player(s) 102(1), 102(2), . . . 102(N), hereinafter referred to individually or collectively as player 102 or player(s) 102, who may interact with respective client device(s) 104(1), 104(2), . . . 104(N), hereinafter referred to individually or collectively as client device 104 or client device(s) 104.

The client devices 104 may be configured to render content associated with the online game to respective players 102. This content may include video, audio, haptic, combinations thereof, or the like content components. The client device(s) 104 may receive game state information from the one or more online gaming system(s) 130 that may host the online game played by the player(s) 102 of environment 100. The receiving of game state information and/or parameters may be via one or more application program interfaces (APIs) of the online game being hosted by the online gaming systems 130.

The client device(s) 104 may use the game state information to render current events of the online game as content. The game state information may be received by the client device(s) 104 repeatedly and/or continuously and/or as events of the online game transpire. The game state information may be based at least in part on the interactions that each of the player(s) 102 have via their client device(s) 104 responsive to events of the online game hosted by the online gaming system(s) 130.

As events transpire in the online game, the online gaming system(s) 130 may update game state information and send that game state information to the game client device(s) 104. For example, if the players 102 are playing an online soccer game, and the player 102 playing one of the goalies move in a particular direction, then that movement and/or goalie location may be represented in the game state information that may be sent to each of the client device(s) 104 for rendering the event of the goalie moving in the particular direction. Similarly, in a first-person shooter game, if one player's avatar shoots another player's avatar, then that shot may be represented in the game state information that may be sent to each of the client device(s) 104 from the online gaming system(s) 130. In this way, the content of the online game is repeatedly updated throughout game play. When the game client device(s) 104 receive the game state information from the online gaming system(s) 130, the game client device(s) 104 may render updated content associated with the online game to its respective player 102. This updated content may embody events that may have transpired since the previous state of the game (e.g., the shot fired by the player's avatar).

The client device(s) 104 may accept input from respective players 102 via respective input or controller device(s) (e.g., joysticks, touchscreens, etc.). The input from the players 102 may be responsive to events in the online game. For example, in an online basketball game, if a player 102 sees an event in the rendered content, such as an opposing team's guard blocking the paint, the player 102 may use his/her input device to try to shoot a three-pointer. Intended action by the player 102, as captured via his/her client device 104 may be sent to the online gaming system(s) 130, such as via one or more APIs, as parameters. Thus, the client devices 104 may send parameters representing player 102 actions to the online gaming system(s) 130, such as via API calls.

The client device(s) 104 may be any suitable device, including, but not limited to a Sony Playstation® line of systems, a Microsoft Xbox® line of systems, any gaming device manufactured by Sony, Microsoft, Nintendo, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 104 may execute programs thereon to interact with the online gaming system(s) 130 and render game content based at least in part on game state information received from the online gaming system(s) 130. Additionally, the client device(s) 104 may send indications of player input (e.g., player intended actions) to the online gaming system(s) 130. Game state information and player input information and/or parameters may be shared between the game client device(s) 104 and the online gaming system(s) 130.

The online gaming system(s) 130 may receive inputs (e.g., parameters representative of player inputs) from various players 102 and update the state of the online game based thereon. As the state of the online game is updated, the state information and/or updates may be sent the various client system(s) 104 for rendering online game content to players 102. In this way, the online gaming system(s) 130 host the online game.

The online gaming system(s) 130, as disclosed herein, may further be configured to spawn and/or control an autoplayer. The autoplayer may be controlled by the online gaming system(s) 130 to play the online game alongside any number of players 102 who may interact with online gaming system(s) 130 via their client devices 104. The autoplayer may be spawned for the purposes of filling an online game that has less than a threshold number of players 102 playing therein. The autoplayer may also be used to replace one or more players 102 who may have started in an online game, but then dropped out of that online game for any variety of reasons.

The autoplayer may operate as a separate function within the online gaming system(s) 130 and, in some cases, may interact with the hosted online game using similar mechanisms as those used by the client device(s) 104. Thus, in example embodiments, the autoplayer, as controlled by the online gaming system(s) 130 may receive game state data as also generated by the online gaming system(s) 130 hosting the online game. The autoplayer function may then respond to the game state data in a similar fashion as the players 102. In other words, the autoplayer may send controller inputs, such as controller inputs that a human would generate by interacting with a game controller, to play the online game. In this way, the autoplayer may repeatedly and/or continuously control a character and/or avatar in the online game. In this way, the autoplayer may play in a similar manner as a human player, in that game state information is processed and reacted to by the autoplayer as operated on either the online gaming system(s) 130 or another platform. In these embodiments, even though the autoplayer functions may be operated on the online gaming system(s) 130 while the online game is also being hosted, the two functions may operate separately on the online gaming system(s) 130.

As described herein, the autoplayers according to example embodiments, may operate according to information that may only be available to human players. Thus, the autoplayer may not react to information during gameplay of the online game that a player 102 would not know and/or discover at the same stage of the game. In other words, the autoplayers may play in a mode of play that is not super-human, or otherwise beyond the capabilities of a human. In this way, the autoplayer may operate in a manner that substantially mimics a human player. As described herein, the autoplayer may generate controller inputs (e.g., inputs that may be made to and/or via a game controller, joystick, mouse, etc.) to control its gameplay and interact with the online game, as hosted by the online gaming system(s) 130. Thus, in example embodiments, the autoplayer may interact with the same APIs that a client device 104 may interact on behalf of a player 102, rather than with the online gaming code at a deeper and/or lower level. This may enhance the human-like characteristics of the autoplayers.

In example embodiments, an autoplayer may be spawned with one or more parameters defined to control aspects of the autoplayer's gameplay. For example, one or more parameters may define any variety of gameplay style (e.g., defensive, aggressive, mixed (defensive and aggressive), etc.), skill level (e.g., on a numerical scale, such as 1 to 100, etc.), shooting accuracy level, level of movement, or any other suitable parameters that may control the style of play of the autoplayer. In some cases, the parameters may be defined when the autoplayer is launched for the purposes of filling an online game or for testing an online game.

In example embodiments, the autoplayers may be controlled according to a deterministic set of actions responsive to game state data of the online games. For example, in a first-person shooter game, the autoplayer may explore the game map according to a pattern and then shoot and/or attempt to kill any hostile and/or opposing players 102. In other cases, there may be variability programmed into the actions of the autoplayers used for online gaming. For example, the autoplayers may randomly change how they move through a virtual world in the online game. These features of the autoplayers may be parameterized and controlled via setting parameters. The parameters for controlling the autoplayers may be provided by any suitable entity (e.g., the online gaming system(s) 130, a developer, a tester, etc.) to guide the nature of the actions of the autoplayers.

In some example embodiments, an autoplayer may be guided by any variety of machine learning, where past interactions with the online game may guide and/or refine future interactions with the online game. In these embodiments, any variety of machine learning, artificial intelligence, and/or heuristic models may be used to guide the actions of the autoplayer. In some cases, autoplayers may be trained prior to deployment and use, and in other cases, the autoplayers may learn-by-doing, or refine gameplay based at least in part on previous gameplay. Any suitable machine learning model(s) may be used for controlling the behavior of autoplayers. For example, autoplayer control model(s) may include a decision tree model, a gaussian tree model, a Bernoulli model, and a random forest model, linear regression models, neural network models, Bayesian network models, any variety of heuristics (e.g., genetic algorithms, swarm algorithms, etc.), combinations thereof, or the like.

The environment 100 may further include a developer system 110 that may be used by a developer 112. The developer 112 may be involved in developing the online game that is to be hosted by the online gaming system(s) 130. In some cases, the developer 112 may create new features of the online game that he or she may wish to test. The developer 112 may use one or more autoplayer(s) for testing the targeted feature. For example, the feature may be a new vehicle that a player's avatar can use to move around within the online game's virtual world. The autoplayer(s) for testing the particular feature may be controlled from the developer system 110, the online gaming system(s) 130, or a combination thereof. Testing a particular feature or set of features may involve an extended use of that feature or features by the autoplayer. While the autoplayer is using the feature(s) to be tested, the autoplayer may log data related to the use of the feature(s) being tested. This log of data can then be used by the developer 112 later on to confirm operation, identify defects, and/or debug the feature(s) being tested by the autoplayer.

The environment 100 may further include a quality assurance (Q/A) system 120 that may be used by a Q/A tester 122. The Q/A tester 122 may be involved in testing the online game that is to be hosted by the online gaming system(s) 130. In some cases, the Q/A tester 122 may wish to test the online game with a plurality of players. It may be difficult or impossible for the Q/A tester 122 to play as a plurality of players to properly test the online game. In example embodiments, the Q/A tester 122 may spawn a plurality of autoplayers to play the online game and collect Q/A data during gameplay. The autoplayer(s) for testing the online game may be controlled from the Q/A test system 120, the online gaming system(s) 130, or a combination thereof. While the autoplayers are playing the online game for testing, the autoplayers may log data related to the online gameplay. This log of data can then be used by the Q/A tester 122 to produce a Q/A test report and/or may be provided to the developer 112 to improve and/or fix any defects discovered in the online game. In some cases, the autoplayers may be deployed to play a relatively long period of time to generate robustness related data associated with the online game, such as mean time between failure (MTBF).

Figure 2:
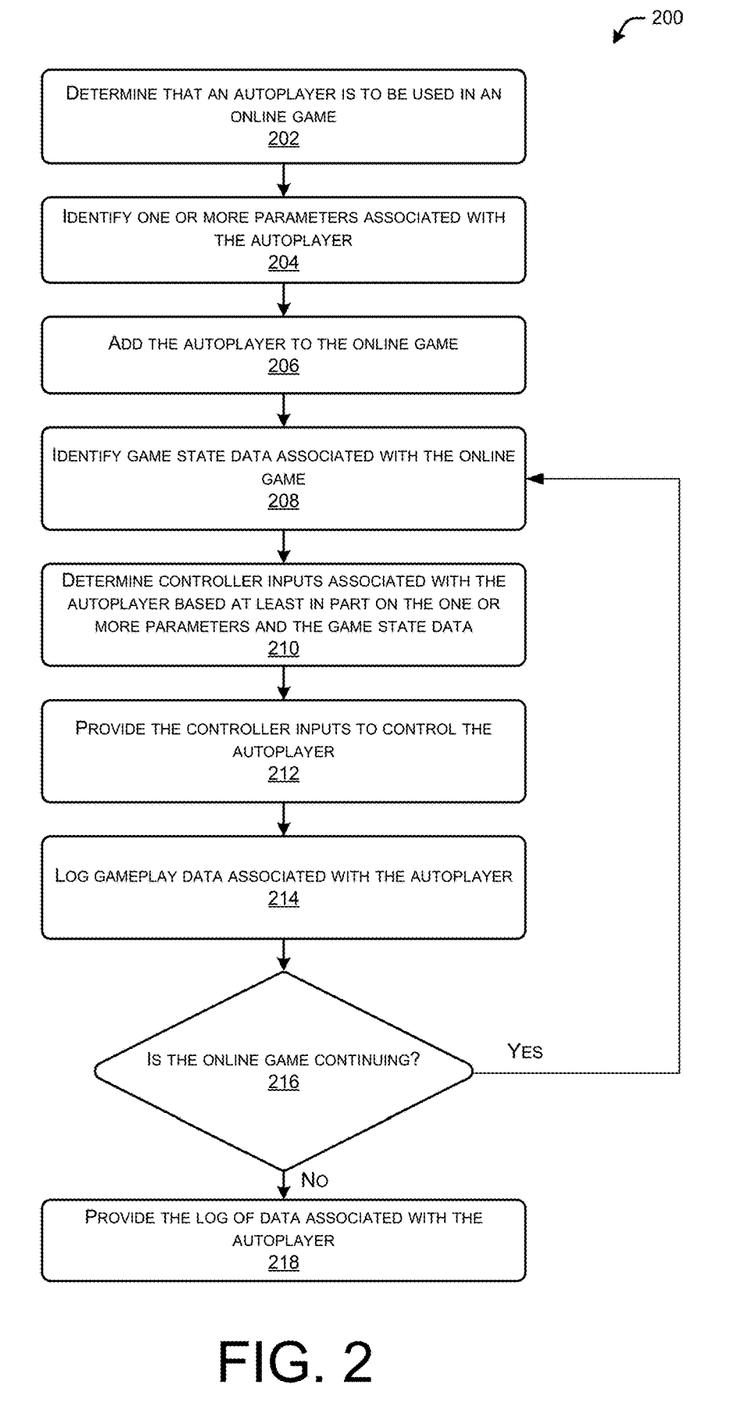
FIG. 2 illustrates a flow diagram of an example method by which an autoplayer may interact with an online game, in accordance with example embodiments of the disclosure.

FIG. 2 illustrates a flow diagram of an example method 200 by which an autoplayer may interact with an online game, in accordance with example embodiments of the disclosure. The autoplayer may be controlled on any one of the online gaming system(s) 130, the developer system 110, and/or the Q/A test system 120. Thus, method 200 may be performed by any one of the online gaming system(s) 130, the developer system 110, and/or the Q/A test system 120, individually or in cooperation with one or more other entities of environment 100.

At block 202, it may be determined that an autoplayer is to be used in an online game. This determination may be based at least in part on a message sent from a Q/A test system 120 and/or a development test system 110 to the online gaming system(s) 130 that an online game is to be commenced with one or more autoplayers. Alternatively, the determination that an autoplayer is to be used may be made by the online gaming system(s) 130 to fill an online game that is about to commence and/or to replace a dropped-out player 102 in an ongoing online game.

At block 204, one or more parameters associated with the autoplayer may be determined. These parameters may be control parameters that indicate and/or enable control of various aspects of how the autoplayer plays the online game. For example, the parameters may indicate a level of skill with which the autoplayer plays, the speed of movement of the autoplayer, the aim/accuracy of the autoplayer, etc. The parameters may be provided by a developer 112, a Q/A tester 122, and/or determined by one or more of the online gaming system(s) 130, the developer system 110, and/or the Q/A test system 120. For example, if the online gaming system(s) 130 are spawning an autoplayer to fill an online game which is not completely filled with players 102, then the online gaming system(s) 130 may set the skill level, using the parameters, of the autoplayer to a skill level that is an average of the skill level of the players 102 of the online game.

At block 206, the autoplayer may be added to the online game. The autoplayer when added, may play the online game with other players 102, other autoplayer(s), or a combination of other players 102 and other autoplayer(s). The autoplayer may be controlled according to the parameters provided for that autoplayer. Other autoplayer(s) may be controlled according to parameters that correspond to each of those autoplayers.

At block 208, game state data may be received and/or identified. The autoplayer control mechanism may consider the game state data. As described herein, the game state data may indicate events that transpire in the online game, positions of various objects in the online game virtual world, actions taken by players 102 within the game, and/or any other descriptive elements of the current state of the online game.

At block 210, controller inputs associated with the autoplayer may be determined based at least in part on the one or more parameters and the game state data. As described herein, the controller inputs may be determined based on information that would be available to a player 102 of the game. The autoplayer may process the game state data to determine the location of the autoplayer's avatar or other controlled object in the game, as well as the location or other properties of other avatars and/or objects in the online game. This information may then guide the autoplayer's next actions, as embodied in the controller inputs generated. The intended actions of the autoplayers may be translated into controller inputs according to the one or more parameters. For example, a parameter associated with skill level may control how closely the autoplayer gets to an intended action. Similarly, a parameter that controls aim, for example, may control how well the autoplayer aims when shooting a gun at an opponent. Thus, based on the one or more parameters and the current state of the game, the autoplayer is able to make its next move by sending the online gaming system(s) 130 controller input(s) intended to bring the next move to fruition within the online game. As discussed herein, in some cases, the behavior of the autoplayer may be deterministic based at least in part on the one or more parameters and the game state data. In other cases, the autoplayers may have some randomization programmed into the actions that it takes responsive to the current game state data. In these cases, the randomization (e.g., level of randomization, constraints, etc.) may be parameterized into the one or more parameters that control the behavior of the online game. In yet other embodiments, the autoplayer may be controlled based at least in part on a machine learning model, as described herein. In these cases, the machine learning model may be generated prior to deploying the autoplayer, or alternatively, the autoplayer may revise its gameplay models as it plays (e.g., learn as it plays).

At block 212, the controller inputs may be provided for the purpose of controlling the autoplayer. When the controller inputs are generated they may be sent to the online gaming system(s) 130 or any other system that may be hosting the online game. In example embodiments, where the autoplayer is controlled by the online gaming system(s) 130 and the online gaming system(s) 130 host the online game, the autoplayer function may be separate from the online game hosting functions of the online gaming system(s) 130. In this case, the online gaming system(s) 130 may send the controller inputs on behalf of the autoplayer function to the online game hosting function, such as via one or more API calls. In embodiments where the autoplayer is controlled by a developer system 110 and/or a Q/A testing system 120, the controller inputs may be sent via a network (e.g., the Internet, a wide area network (WAN), etc.) to the online gaming system(s), such as via one or more API calls.

At block 214, gameplay data associated with the autoplayer may be logged. This data may include how long the autoplayer played, how many kills it had, other performance metrics, total distance moved, total attacks upon it, and/or any suitable data that may be useful to track. In some cases, the data that may be tracked by the autoplayer may be selectable, such as via the one or more parameters to control the characteristics of the autoplayer. For example, if a developer 112 wishes to test a feature of an online game using an autoplayer, the developer 112 may wish to set parameters that instruct the autoplayer to not only focus on using the feature being tested, but to also collect data that is focused on the use of that feature (e.g., amount of time feature is used, any outcomes of the feature, any defects observed with the feature, any affect the feature has on other features of the online game, etc.).

At block 216, it may be determined if the online game is continuing. If the online game is continuing, then the method may return to block 208, where new game state data is identified and the autoplayer is controlled responsive to the new game state data, representing the updated state of the online game. If at block 216 it is determined that the online game has ended, then, at block 218, the data logged by the autoplayer may be provided, such as to a developer 112, Q/A tester 122, or be stored in a database that can be accessed at a later time. This logged data may be used to study the effectiveness of the autoplayer and/or to determine test performance of the online game, or features thereof.

It should be noted that some of the operations of method 200 may be performed out of the order presented, with additional elements, and/or without some elements. For example, the data logging by the autoplayers may be optional and may not be performed in some cases. Some of the operations of method 200 may further take place substantially concurrently and, therefore, may conclude in an order different from the order of operations shown above.

Figure 3:
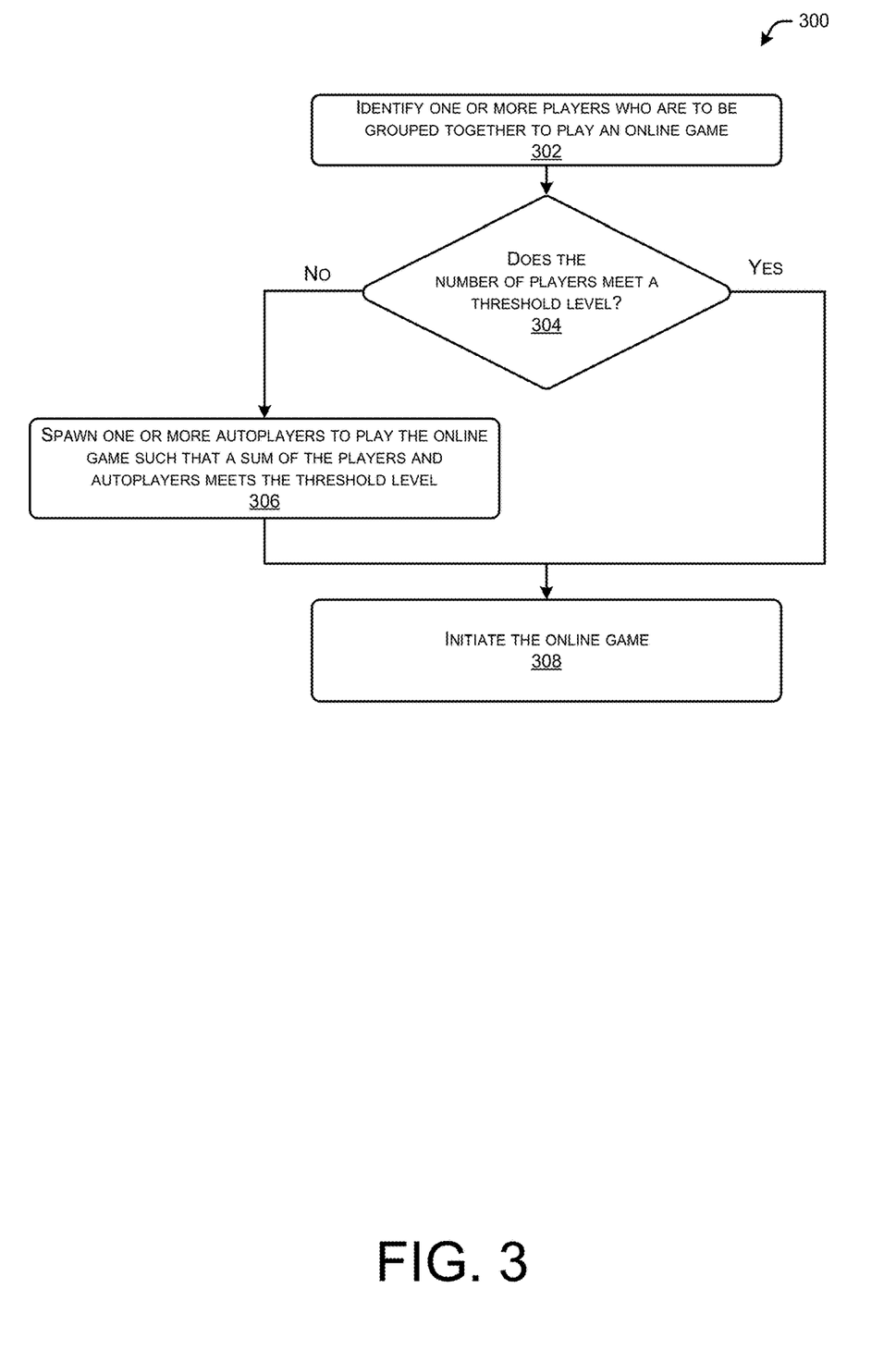
FIG. 3 illustrates a flow diagram of an example method by which autoplayers are added to fill an online game with a threshold number of players, in accordance with example embodiments of the disclosure.

FIG. 3 illustrates a flow diagram of an example method by which autoplayers are added to fill an online game with a threshold number of players, in accordance with example embodiments of the disclosure. The method 300 may be performed by the online gaming system(s) 130, individually or in cooperation with one or more other elements of the environment 100.

At block 302, one or more players who are to be grouped together to play an online game may be identified. In some cases, players 102 who wish to play the online game may be placed in a virtual waiting room while other players 102 are allowed to attempt joining the online game. The players 102 may be held in the waiting room for a predetermined period of time (e.g., 2 minutes) or until a sufficient number of players join the waiting room to form the online game. In some cases, players 102 may be sorted into separate games based on any suitable factor, such as skill level, Internet speed level, location in the world, etc. At a point where the players 102 from the virtual waiting room have waited a predetermined period of time, the players 102 may be grouped into the online game.

At block 304, whether the number of players meet a threshold level may be determined. If it is determined that the number of players do meet the threshold level, then the method 300 may advance to block 308, where the online game may be initiated with the one or more players who are to be grouped together to play the online game. If, on the other hand, it is determined that the number of players do not meet the threshold level, then the method may proceed to block 306, where one or more autoplayer(s) may be spawned to play the online game. In this case, the sum of the number of autoplayers and the number of players 102 meets or exceeds the threshold level. The autoplayer(s) that are to play the online game may be controlled according to method 200 of FIG. 2. The method 300 may then proceed to block 308, where the online game may be initiated with the one or more players and the one or more autoplayers.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

Figure 4:
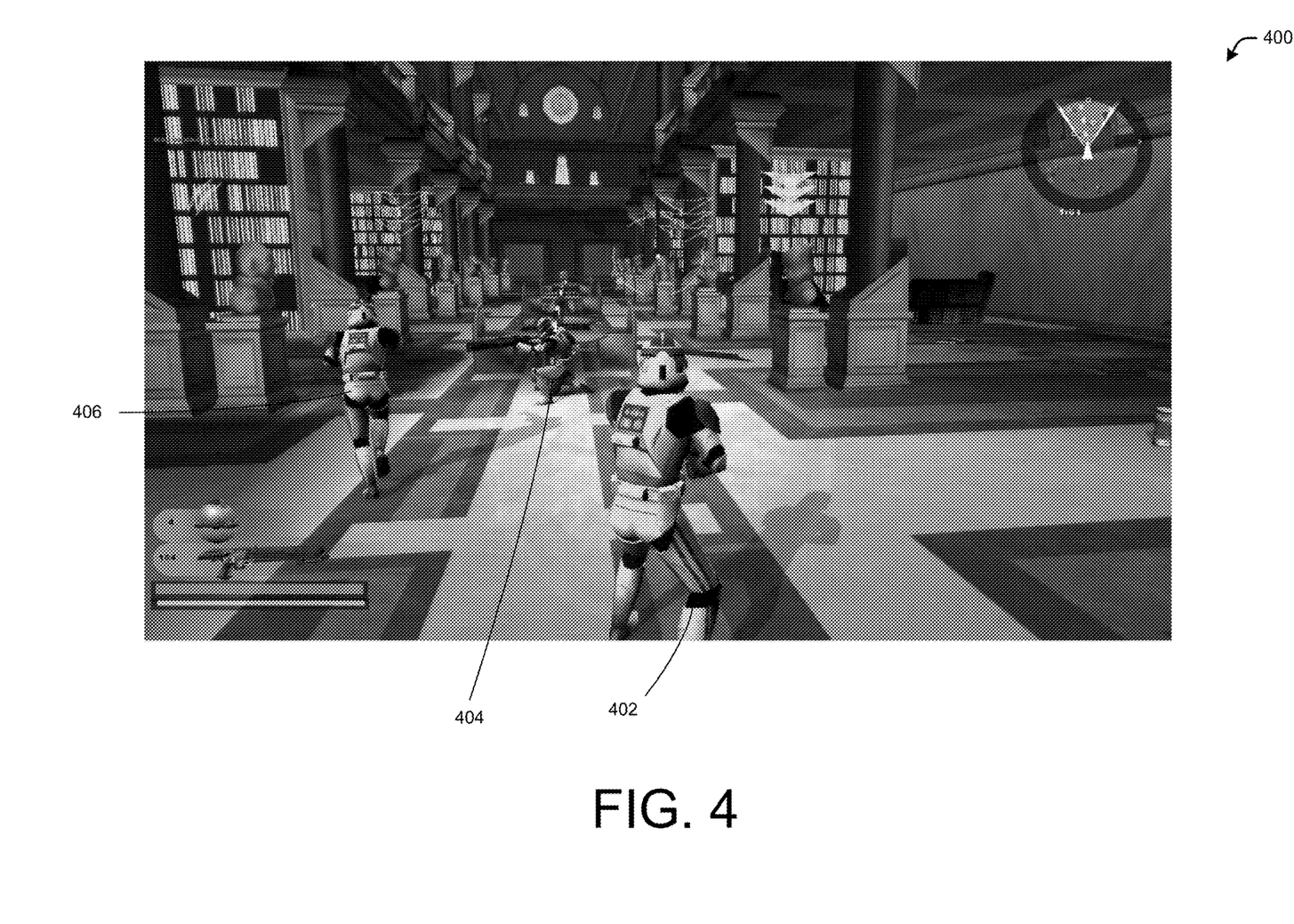
FIG. 4 illustrates an example screen capture of an online game with one or more autoplayers, in accordance with example embodiments of the disclosure.

FIG. 4 illustrates an example screen capture 400 of an online game with one or more autoplayers, in accordance with example embodiments of the disclosure. As shown, there may be a variety of avatars 402, 404, 406 in the online game. In this case, the game is a third-person shooter game. However, the online game may be any suitable type and/or genre of online game. One or more of the avatars 402, 404, 406 may be controlled by an autoplayer, while the remaining avatars 402, 404, 406 may be controlled by players 102. In this way, players 102 and autoplayers may interact during gameplay of the online game. In this case the players 102 and autoplayers, as represented by their respective avatars 402, 404, 406, are cooperating during gameplay, but in other cases, the players 102 and autoplayers may be hostile toward each other.

Figure 5:
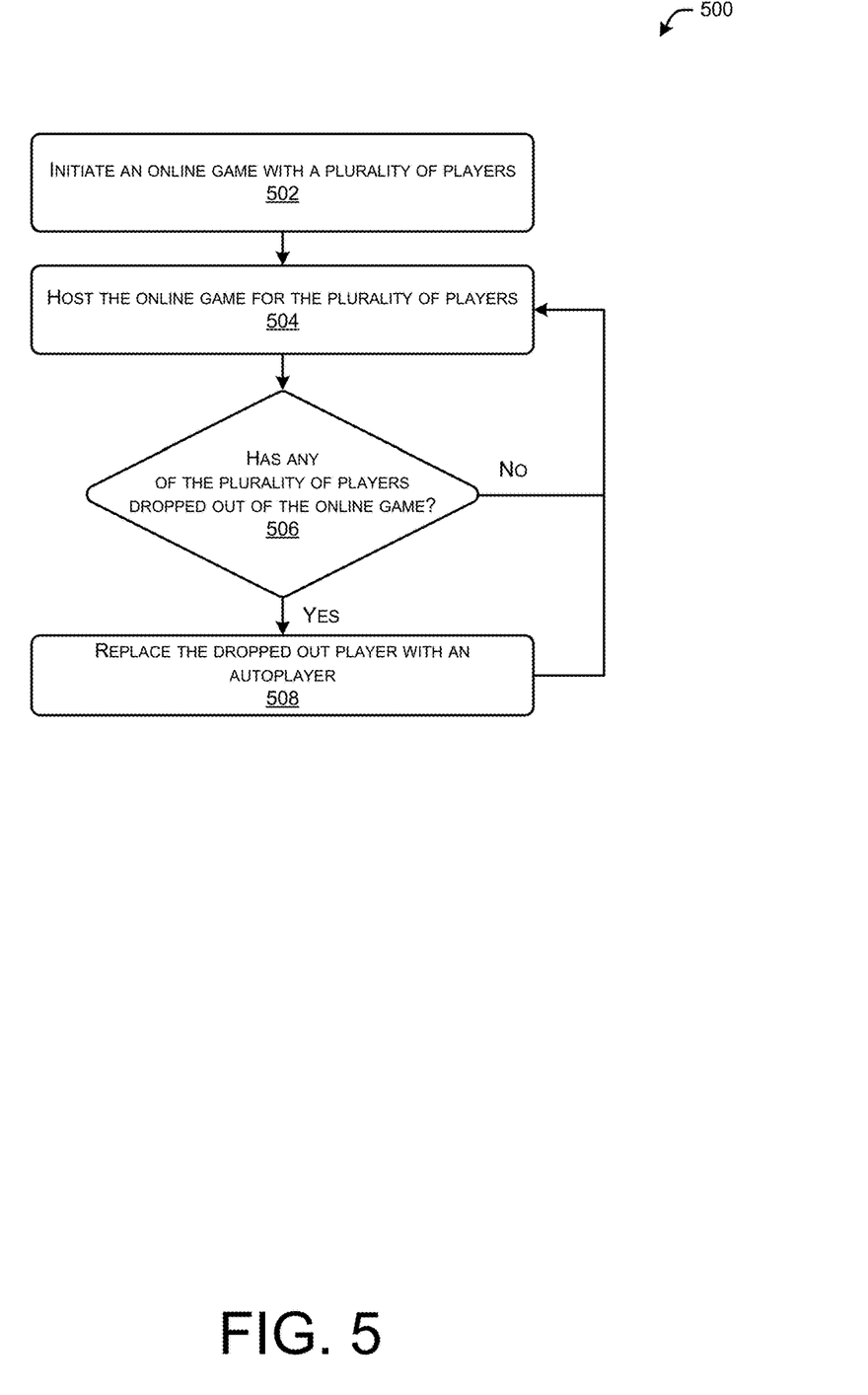
FIG. 5 illustrates a flow diagram of an example method to replace a player who drops out of an online game with an autoplayer, in accordance with example embodiments of the disclosure.

FIG. 5 illustrates a flow diagram of an example method 500 to replace a player who drops out of an online game with an autoplayer, in accordance with example embodiments of the disclosure. The method 500 may be performed by the online gaming system(s) 130, individually or in cooperation with one or more other elements of the environment 100.

At block 502, an online game may be initiated with a plurality of players. The players 102 may be pooled in a virtual waiting room for a period of time to accumulate additional players 102 or until the online game is full. At block 504, the online game may be hosted for the plurality of players. As described herein, the online game may be hosted by the online gaming system(s) 130 interacting with the client devices 104 of the players 102 in the online game.

At block 506, it may be determined whether any players have dropped out of the online game. If no players have dropped out of the online game, then the method 500, at block 504, may continue to host the online game and continue to check to verify if any player has dropped out of the online game. If, on the other hand, no player 102 has dropped out of the online game, then at block 508, the dropped-out player may be replaced with an autoplayer. The autoplayer, replacing the dropped-out player 102, may be controlled by the online gaming system(s) 130 according to method 200 of FIG. 2. In some cases, the autoplayer may have parameters set for playing (e.g., skill level, amount of movement, amount of weapons use, etc.) the online game in a manner similar to the dropped-out player 102. The characteristics of the dropped-out player 102 may be determined from gameplay data of the player from previous gaming by that player 102 and/or based at least in part on the dropped-out player's gameplay before he or she dropped out of the online game.

It should be noted that some of the operations of method 500 may be performed out of the order presented, with additional elements, and/or without some elements. Some of the operations of method 500 may further take place substantially concurrently and, therefore, may conclude in an order different from the order of operations shown above.

Figure 6:
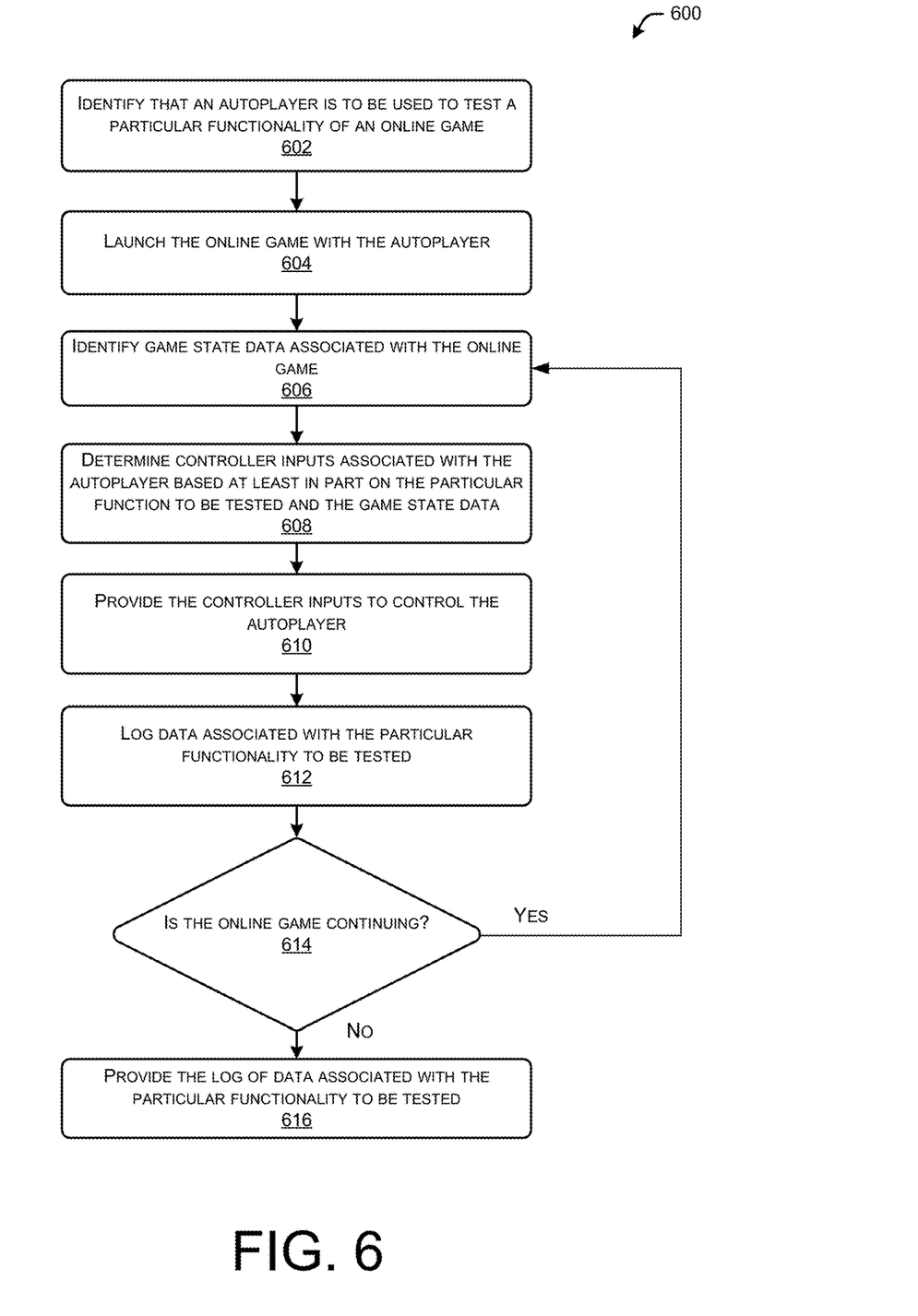
FIG. 6 illustrates a flow diagram of an example method to test a particular feature of an online game using an autoplayer, in accordance with example embodiments of the disclosure.

FIG. 6 illustrates a flow diagram of an example method 600 to test a particular feature of an online game using an autoplayer, in accordance with example embodiments of the disclosure. The method 600 may be performed by the developer system 110, individually or in cooperation with one or more other elements of the environment 100. Alternatively, or additionally, the method 300 may be performed by the Q/A test system 120 and/or the online gaming system(s) 130.

At block 602, it may be identified that an autoplayer is to be used to test a particular functionality or feature of an online game. As discussed herein, this autoplayer may be controlled by the online gaming system(s) 130 or the developer system 110. The functionality to be tested may be any suitable functionality, such as a new weapon, a new vehicle, a new move that a character and/or avatar can make, etc. In some cases, a developer 110 may wish to test the functionality in a quick-feedback manner by using the autoplayer. In some cases, there may be more than one autoplayer that plays the online game to test the functionality. At block 604, the online game may be launched with the autoplayer. In some cases, there may be more than one autoplayer in the online game or even other player(s) 102.

At block 606, game state data associated with the online game may be identified. As described above, game state data may be received from the online gaming system(s) 130 on a continuous basis as the online game transpires. The game state data may, therefore, be received by the developer system 110 or the autoplayer function on the online gaming system(s) 130 at a particular snapshot in time. As described herein, the game state data may indicate events that transpire in the online game, positions of various objects in the online game virtual world, actions taken by players 102 within the game, and/or any other descriptive elements of the current state of the online game.

At block 608, controller inputs associated with the autoplayer may be determined based at least in part on the particular function to be tested and the game state data. In some cases, the controller inputs may be determined based on information that would be available to a player 102 of the game. In other cases, and for the purposes of testing, the autoplayer may have and, further, may act upon information that may not be available to a human player 102. For example, the autoplayer may act upon hazards that may be obfuscated from a human player 102 during gameplay. The super-human gameplay may be desirable in certain situations, such as when it might be fruitful to extend the autoplayers lifetime to effectively test the function for which the autoplayer was implemented. The autoplayer may process the game state data to determine the location of the autoplayer's avatar or other controlled object in the game, as well as the location or other properties of other avatars and/or objects in the online game. This information may then guide the autoplayer's next actions, as embodied in the controller inputs generated. The autoplayer may operate such that it maximizes the amount of time, to the extent possible, testing the functionality that it is to test.

At block 610, the controller inputs may be provided to control the autoplayer. When the controller inputs are generated they may be sent to the online gaming system(s) 130 or any other system that may be hosting the online game. In example embodiments, where the autoplayer is controlled by the online gaming system(s) 130 and the online gaming system(s) 130 hosts the online game, the autoplayer function may be separate from the online game hosting functions of the online gaming system(s) 130. In this case, the online gaming system(s) 130 may send the controller inputs on behalf of the autoplayer function to the online game hosting function, such as via one or more API calls. In embodiments where the autoplayer is controlled by a developer system 110 and/or a Q/A testing system 120, the controller inputs may be sent via a network (e.g., the Internet, a wide area network (WAN), etc.) to the online gaming system(s), such as via one or more API calls.

At block 612, data associated with the particular functionality to be tested may be logged. This data may include any variety of metrics associated with the functionality. For example, for a new weapon, data related to number of shots, number of kills, any slowdown of the avatar due to carrying the weapon, etc. may be logged. In some cases, the data that may be tracked by the autoplayer may be selectable, such as via the one or more parameters to control the characteristics of the autoplayer.

At block 614, it may be determined if the online game is continuing. If the game is continuing, then the method may return to block 606, where new game state data is identified and the autoplayer is controlled responsive to the new game state data, representing the updated state of the online game. If at block 614 it is determined that the online game has ended, then, at block 616, the data logged by the autoplayer may be provided. This logged data may be used to study the effectiveness of the autoplayer and/or to determine test performance of the online game, or features thereof.

It should be noted that some of the operations of method 600 may be performed out of the order presented, with additional elements, and/or without some elements. Some of the operations of method 600 may further take place substantially concurrently and, therefore, may conclude in an order different from the order of operations shown above.

Figure 7:
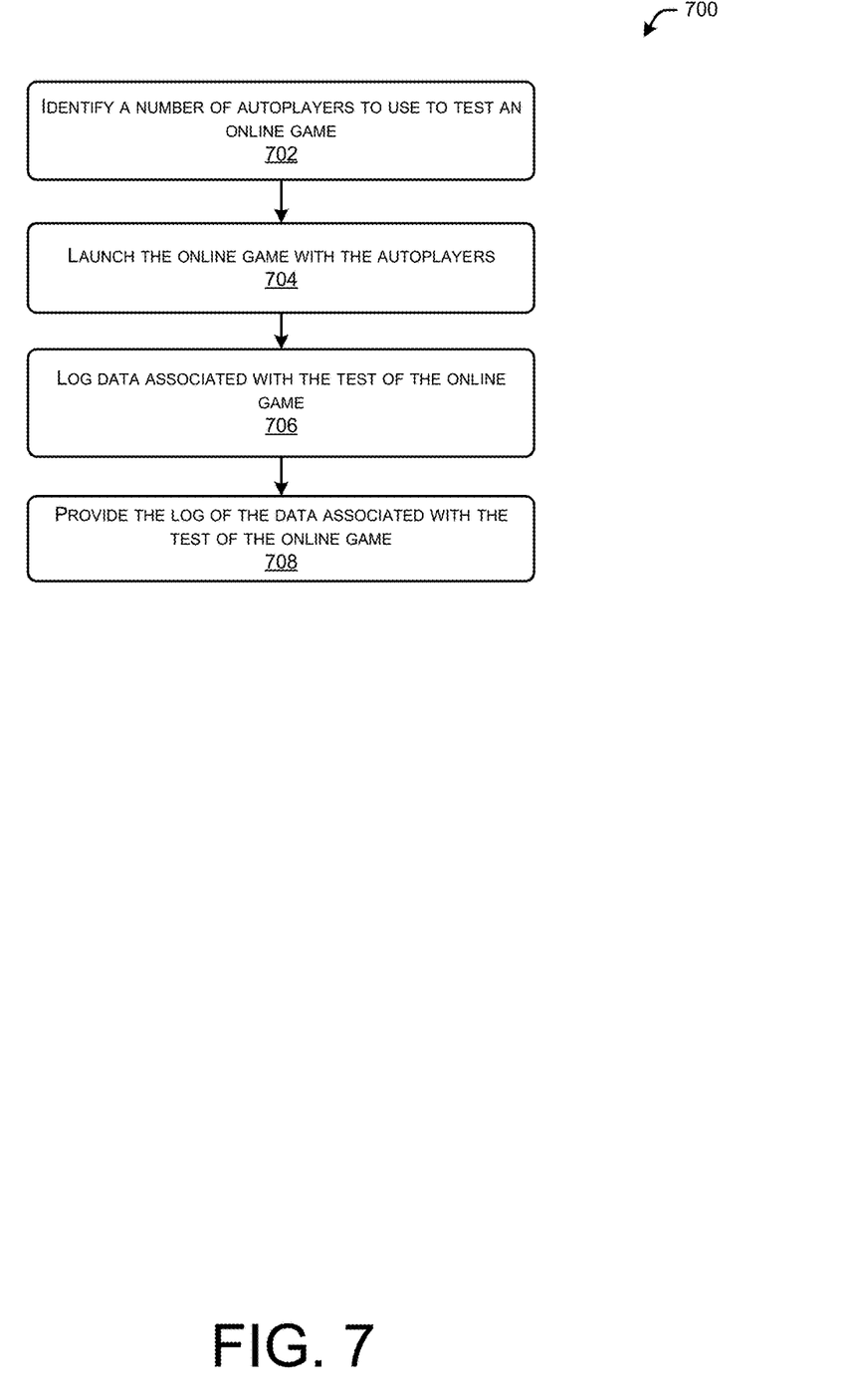
FIG. 7 illustrates a flow diagram of an example method to test an online game with one or more autoplayers, in accordance with example embodiments of the disclosure.

FIG. 7 illustrates a flow diagram of an example method 700 to test an online game with one or more autoplayers, in accordance with example embodiments of the disclosure. The method 700 may be performed by the Q/A test system 120, individually or in cooperation with one or more other elements of the environment 100. Alternatively, or additionally, the method 300 may be performed by the developer system 110 and/or the online gaming system(s) 130.

At block 702, a number of autoplayers to use to test an online game may be identified. This number may be determined by a standard procedure in some cases. In other cases, this number may be determined by a developer 112 or a Q/A tester 122. In some cases, a relatively large number of autoplayers may be selected to stress test the online gaming platform (e.g., the online gaming system(s) 130 and the related hardware, software, and/or network infrastructure). In some cases, it may be desirable to identify robustness of the online game (e.g., MTBF, number of players 102, slowdown due to player 102 load, etc.).

At block 704, the online game may be launched with the autoplayers. As discussed herein the online game may be hosted by the online gaming system(s) 130 and the autoplayer(s) may be controlled by the Q/A test system 120, the developer system 110, the online gaming system(s) 130, and/or any combination thereof.

At block 706, data associated with the test of the online game may be logged. This data may include any suitable data, such as data related to the hosting of the online game. For example, any unexpected actions, as manifested in the game state data may be reported and/or logged, such as any lags in receiving or sending game state data and/or controller input data, any hard failures, total time of play, etc. At block 708, the log of the data associated with the test of the online game may be provided. As described herein, the logged data may provide information to the operators of the online game pertaining to the robustness of the online game, under what conditions the online game ought to be operated, the MTBF, spurious interactions that were unanticipated, etc.

It should be noted that some of the operations of method 700 may be performed out of the order presented, with additional elements, and/or without some elements. Some of the operations of method 700 may further take place substantially concurrently and, therefore, may conclude in an order different from the order of operations shown above.

Figure 8:
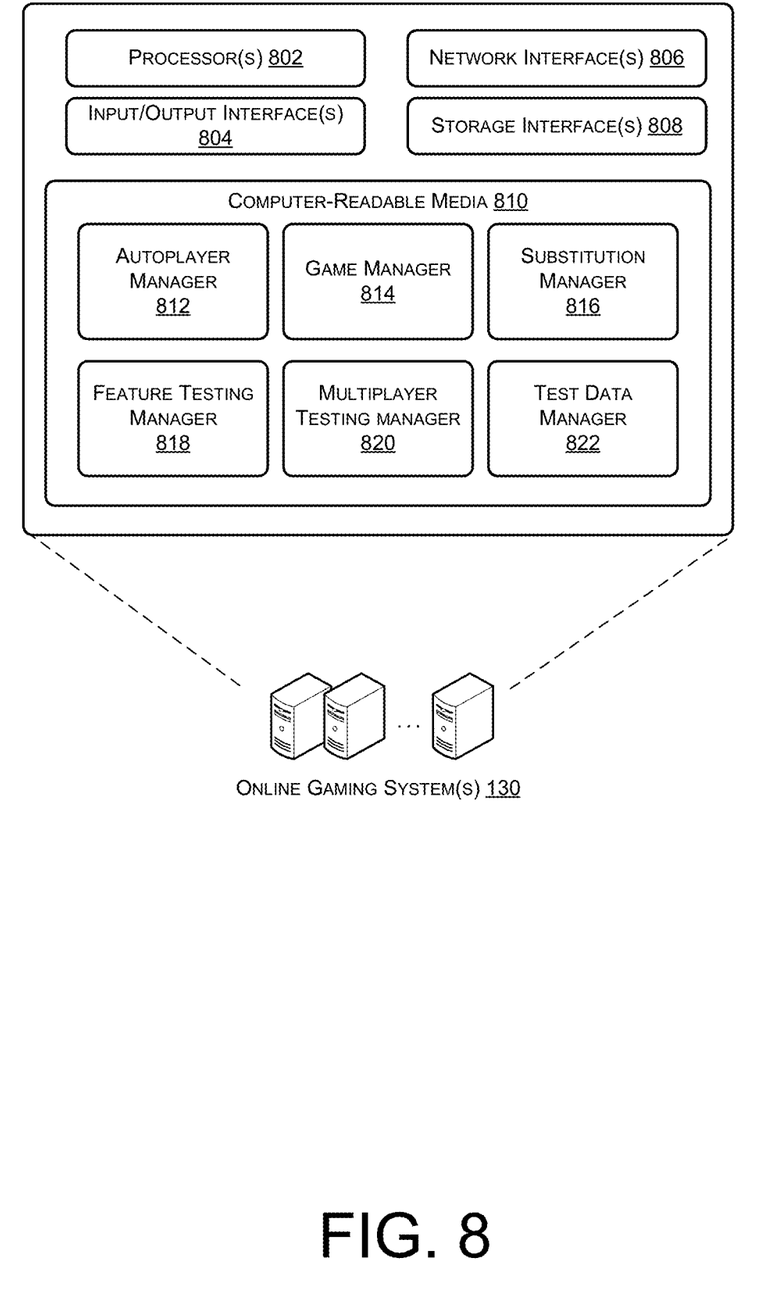
FIG. 8 illustrates a block diagram of example online gaming system(s) that may enable autoplayers for online games, in accordance with example embodiments of the disclosure.

FIG. 8 illustrates a block diagram of example online gaming system(s) 130 that may enable autoplayers for online games, in accordance with example embodiments of the disclosure. The block diagram may also represent the hardware and software of the developer system 110 and/or the Q/A test system 120.

The online gaming system(s) 130 may include one or more processor(s) 802, one or more input/output (I/O) interface(s) 804, one or more network interface(s) 806, one or more storage interface(s) 808, and computer-readable media 810.

In some implementations, the processors(s) 802 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 802 may possess its own local memory, which also may store program modules, program data, and/or one or more operating system(s). The one or more processor(s) 802 may include one or more cores.

The one or more input/output (I/O) interface(s) 804 may enable the online gaming system(s) 130 to detect interaction with a user and/or other system(s), such as client devices 104. The I/O interface(s) 804 may include a combination of hardware, software, and/or firmware and may include software drivers for enabling the operation of any variety of I/O device(s) integrated on the online gaming system(s) 130 or with which the online gaming system(s) 130 interacts, such as displays, microphones, speakers, cameras, switches, and any other variety of sensors, or the like.

The network interface(s) 806 may enable the online gaming system(s) 130 to communicate via the one or more network(s). The network interface(s) 806 may include a combination of hardware, software, and/or firmware and may include software drivers for enabling any variety of protocol-based communications, and any variety of wireline and/or wireless ports/antennas. For example, the network interface(s) 806 may comprise one or more of a cellular radio, a wireless (e.g., IEEE 802.1x-based) interface, a Bluetooth® interface, and the like. In some embodiments, the network interface(s) 806 may include radio frequency (RF) circuitry that allows the online gaming system(s) 130 to transition between various standards. The network interface(s) 806 may further enable the online gaming system(s) 130 to communicate over circuit-switch domains and/or packet-switch domains.

The storage interface(s) 808 may enable the processor(s) 802 to interface and exchange data with the computer-readable medium 810, as well as any storage device(s) external to the online gaming system(s) 130.

The computer-readable media 810 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 810 may be implemented as computer-readable storage media (CRSM), which may be any available physical media accessible by the processor(s) 802 to execute instructions stored on the memory 810. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 802. The computer-readable media 810 may have an operating system (OS) and/or a variety of suitable applications stored thereon. The OS, when executed by the processor(s) 802 may enable management of hardware and/or software resources of the online gaming system(s) 130.

Several functional blocks having instruction, data stores, and the like may be stored within the computer-readable media 810 and configured to execute on the processor(s) 802. The computer readable media 810 may have stored thereon an autoplayer manager 812, a game manager 814, a substitution manager 816, a feature testing manager 818, a multiplayer testing manager 820, and a test data manager 822. It will be appreciated that each of the functional blocks 812, 814, 816, 818, 820, 822, may have instructions stored thereon that when executed by the processor(s) 802 may enable various functions pertaining to the operations of the online gaming system(s) 130.

The instructions stored in the autoplayer manager 812, when executed by the processor(s) 802, may configure the online gaming system(s) 130 to control an autoplayer or a plurality of autoplayers. The autoplayers, as discussed herein may operate as a function separate from any online gaming functions of the online gaming system(s) 130. In other words, in cases where the online gaming system(s) 130 control the autoplayer, the autoplayer may be operated by the processor(s) 802 in a parallel processing capacity with hosting the online game. The autoplayers may be controlled by the processor(s) 802 to receive game state data from the online game, such as via one or more APIs, and then generate controller inputs based at least in part on the game state data, to control the autoplayer. The controller inputs may be provided to the online game to control the autoplayers. In some cases, the autoplayers may further be controlled by the parameters, such as control parameters, that control the characteristics of the autoplayer's gameplay.

The instructions stored in the game manager 814, when executed by the processor(s) 802, may configure the online gaming system(s) 130 to manage the game with human players 102 and autoplayers. In some cases, the processor(s) 802 may identify the number of players 102 and determine if autoplayers need to be added to a particular online game to fill out the online game with players. The number of players 102 may be compared to a threshold level to make a determination of whether autoplayers are to be implemented to fill a game.

The instructions stored in the substitution manager 816, when executed by the processor(s) 802, may configure the online gaming system(s) 130 to periodically and/or continuously monitor an online game to determine if any players 102 drop out. If a player drops out of an ongoing online game, the processor(s) 802 may, under some circumstances, implement an autoplayer to replace the dropped-out player 102.

The instructions stored in the feature testing manager 818, when executed by the processor(s) 802, may configure the online gaming system(s) 130 to test a particular feature and/or function of the online game. In some cases, this feature may be newly implemented and/or still in development. The processor(s) 802 test this feature by running one or more autoplayers that attempt to use the feature being tested in an exaggerated manner (e.g., time of use, amount used, various ways of use, etc.). The autoplayer(s) may log data that is specific to the feature being tested, so that that data can later be used to assessing and/or debugging the tested feature.

The instructions stored in the multiplayer testing manager 820, when executed by the processor(s) 802, may configure the online gaming system(s) 130 to launch a plurality of autoplayers and, in some cases, a relatively large number of autoplayers. The autoplayers may play the online game for a long time and may stress the capabilities of the online game to provide a measure of robustness of the online game.

The instructions stored in the test data manager 822, when executed by the processor(s) 802, may configure the online gaming system(s) 130 to log data by way of an autoplayer or a group of autoplayers. This logged data may be any variety of descriptions, numerical or qualitative, of the interactions an autoplayer or a group of autoplayers may have with the online game. The data may be at any suitable level of granularity and may be stored by the processor(s) 802 for later retrieval and analysis.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
    one or more processors; and
    one or more non-transitory computer-readable media storing computer-executable instructions that, when executed by the one or more processors, cause the one or more processors to:
    identify a plurality of characters corresponding to player accounts, that are to be grouped together to play an online game, the plurality of characters including a first character;
    instantiate the online game with the plurality of characters;
    determine that the first character has dropped out of the online game after initiating gameplay;
    generate a replacement autoplayer to replace the first character in the online game;
    generate virtual controller inputs for the replacement autoplayer; and
    control the replacement autoplayer based at least in part on the virtual controller inputs.

2. The system of claim 1, wherein the computer-executable instructions further cause the one or more processors to:
    identify game state data associated with the online game, wherein the virtual controller inputs are generated based at least in part on the game state data.

3. The system of claim 1, wherein the computer-executable instructions further cause the one or more processors to:
    determine that a number of the plurality of characters is less than a threshold value; and
    determine, based at least in part on the number of the plurality of characters being less than the threshold value, that one or more autoplayers are to be added to the online game, wherein the online game includes the one or more autoplayers.

4. The system of claim 3, wherein a sum of a number of the one or more autoplayers and the number of the plurality of characters equals a player capacity of the online game.

5. The system of claim 3, wherein a sum of a number of the one or more autoplayers and the number of the plurality of characters equal or exceed a threshold value.

6. The system of claim 1, wherein the virtual controller inputs are based at least in part on a level of skill of at least one of the plurality of characters.

7. The system of claim 1, wherein the computer-executable instructions further cause the one or more processors to:
    log gameplay data associated with the replacement autoplayer during the online game.

8. A method, comprising:
    identifying, by one or more processors, a plurality of characters that are to be grouped together to play an online game;
    determining, by the one or more processors, that a number of the plurality of characters is less than a threshold value;
    determining, by the one or more processors and based at least in part on the number of the plurality of characters being less than the threshold value, that one or more autoplayers are to be added to the online game;
    initiating, by the one or more processors, the online game with the plurality of characters and the one or more autoplayers; and
    controlling, by the one or more processors, the one or more autoplayers during gameplay of the online game.

9. The method of claim 8, wherein controlling the one or more autoplayers during gameplay of the online game further comprises:
    receiving, by the one or more processors, game state information associated with the online game;
    determining, by the one or more processors and based at least on the game state information, virtual controller inputs associated with the one or more autoplayers; and
    providing, by the one or more processors, the virtual controller inputs to control the one or more autoplayers.

10. The method of claim 8, wherein the one or more autoplayers include a first autoplayer, the method further comprising:
    determining, by the one or more processors, an aggregate skill level of the plurality of characters;
    determining, by the one or more processors and based at least in part on the aggregate skill level of the plurality of characters, virtual controller inputs for controlling the first autoplayer; and
    providing, by the one or more processors, the virtual controller inputs to control the first autoplayer.

11. The method of claim 8, wherein determining that the one or more autoplayers are to be added to the online game, further comprises:
    determining, by the one or more processors, a number of the one or more autoplayers, such that a sum of the number of the one or more autoplayers and the number of the plurality of characters equal or exceed the threshold value.

12. The method of claim 8, wherein a sum of a number of the one or more autoplayers and the number of the characters equals a player capacity of the online game.

13. The method of claim 8, further comprising:
    determining, by the one or more processors, that a particular character of the plurality of characters has dropped out of the online game; and initiating, by the one or more processors, a replacement autoplayer to replace the particular character in the online game.

14. The method of claim 13, further comprising:
controlling, by the one or more processors, the replacement autoplayer such that the replacement autoplayer plays the online game with an autoplayer skill level that is within a threshold level of a skill level of the particular character.

15. The method of claim 13, further comprising:
determining, by the one or more processors, that a second particular character of the plurality of characters has dropped out of the online game; and
initiating, by the one or more processors, a second replacement autoplayer to replace the second particular character in the online game.

16. The method of claim 13, further comprising:
logging, by the one or more processors, gameplay data associated with the replacement autoplayer during the online game.

17. A method, comprising:
initiating, by one or more processors, an online game with an autoplayer to test at least one feature of the online game;
identifying one or more parameters to control the autoplayer, the one or more parameters associated with at least one or more of a gameplay style, a skill level, a shooting accuracy, or a level of movement;
determining, by the one or more processors and based at least in part on game state data and the one or more parameters, one or more virtual controller inputs associated with the autoplayer; and
controlling, by the one or more processors, the autoplayer by sending the one or more virtual controller inputs to an online gaming system.

18. The method of claim 17, further comprising:
initiating, by the one or more processors, the online game with a second autoplayer, the second autoplayer controlled by a second system and based at least in part on the game state data.

19. The method of claim 17, further comprising:
logging, by the one or more processors, data associated with gameplay of the autoplayer in the online game to generate logged data.

20. The method of claim 17, further comprising:
adding additional autoplayers to the online game, wherein a number of autoplayers in the online game equals a player capacity of the online game.

* * * * *